(12) United States Patent
Ewing et al.

(10) Patent No.: US 6,176,710 B1
(45) Date of Patent: Jan. 23, 2001

(54) BATTERY FEED CONNECTOR FOR NETWORK POWER CONTROLLERS

(76) Inventors: Carrel W. Ewing, 585 Washington, Palo Alto, CA (US) 94301; Andrew J. Cleveland, 12467 Creek View Ct., San Martin, CA (US) 95046

( * ) Notice: Under 35 U.S.C. 154(b), the term of this patent shall be extended for 0 days.

(21) Appl. No.: 09/461,560

(22) Filed: Dec. 14, 1999

(51) Int. Cl.$^7$ .......................... H01R 12/00; H01R 13/73; H01R 9/22; H05K 1/00; H02B 1/01
(52) U.S. Cl. .......................... 439/76.1; 439/564; 439/722
(58) Field of Search .................. 439/76.1, 709, 439/564, 801, 722, 135, 92, 95, 108, 627, 500

(56) References Cited

U.S. PATENT DOCUMENTS

| | | | | |
|---|---|---|---|---|
| 4,385,791 | * | 5/1983 | Lovrenich | 439/83 |
| 4,432,038 | * | 2/1984 | Bell | 361/722 |
| 5,192,216 | * | 3/1993 | Knauber et al. | 439/108 |
| 5,368,506 | * | 11/1994 | Heimbrock | 439/813 |
| 5,563,770 | * | 10/1996 | Bethurum | 361/737 |
| 5,823,796 | * | 10/1998 | Bethurum | 439/76.1 |
| 5,947,771 | * | 9/1999 | Bethurum | 439/668 |
| 6,071,130 | * | 6/2000 | Johnson | 439/92 |

\* cited by examiner

*Primary Examiner*—Paula Bradley
*Assistant Examiner*—Edwin A. Leon

(57) ABSTRACT

A battery power connector comprises a plastic block with a pair of raised pedestals at opposite ends of one side that fit through rectangular cutouts in the rear panel of a RETMA-rack chassis. A pair of bolt holes in the rear panel between the cutouts and a matching pair of bolt holes between the raised pedestals in the plastic block allow for a mounting that is electrically isolated for positive and negative, and conductive for ground in the middle. Inside the chassis, a double-sided printed circuit board is bolted to the back of the plastic block with three pairs of bolts, one pair each for positive, ground, and negative battery cable connections. A threaded backing plate is provided on the outside to receive each of the three pairs of bolts, one for each positive, ground, and negative battery cable connection. A two-hole battery-cable lug is then bolted over each threaded backing plate and is held tightly with two nuts and lockwashers each. The printed circuit board provides several wire lugs inside for both battery potentials to be wired to individual on-off power control modules.

7 Claims, 3 Drawing Sheets

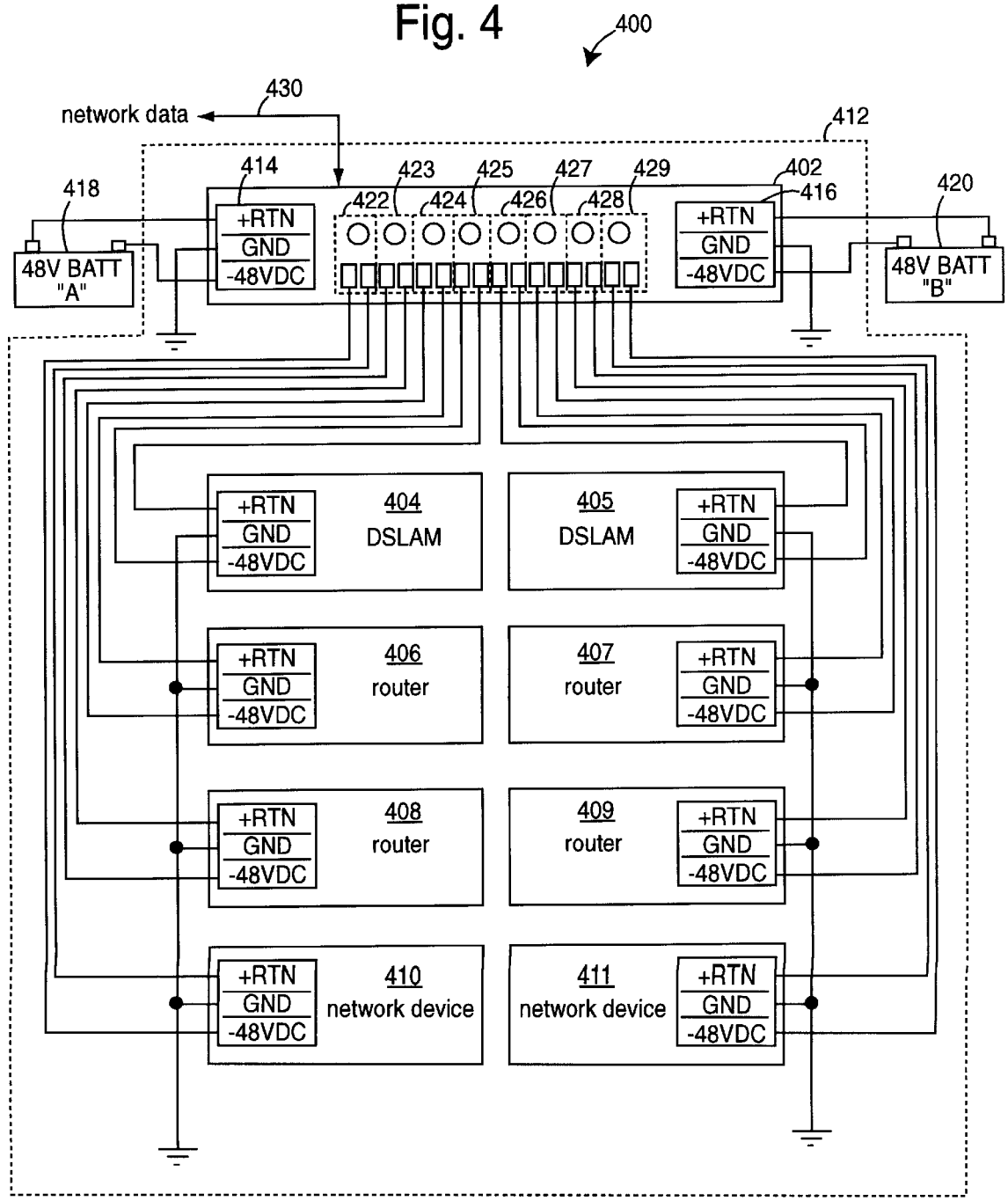

BATTERY FEED CONNECTOR FOR NETWORK POWER CONTROLLERS

BACKGROUND OF THE INVENTION

1. Field of the Invention

The invention relates generally to computer network power controllers and more particularly to battery feed connectors that couple in high-amperage 48-volt buses to RETMA rack chassis units.

2. Description of the Prior Art

There is a growing need for competitive local exchange carriers to manage remote power control functions of internetworking devices at telephone company (telco) central offices. Competitive local exchange carriers (CLECs), incumbent local exchange carriers (ILECs), independent telephone companies, and other next generation service providers are now all offering a digital subscriber line (DSL) service that promises high-speed Internet access for both homes and businesses. DSL is expected to replace integrated services digital network (ISDN) equipment and lines, and DSL competes very well with the T1 line that has historically been provided by ILECs. A DSL drop costs about $40–60 per month, and is expected to quickly become the dominant subscriber-line technology.

The DSL service is provided by a switch that is co-located in a telco central office, i.e., a digital subscriber line access multiplexer (DSLAM). Many new competitive local exchange carriers are now deploying DSL service in several states. They are installing digital subscriber line access multiplexers in many locations. Such digital subscriber line access multiplexers are now available from a number of different manufacturers, e.g., Paradyne, Copper Mountain, Ascend, etc.

Nearly all such digital subscriber line access multiplexers are powered by 48-VDC battery power and all have operator console ports. And for emergencies, these DSLAMs usually have two independent 48-VDC battery power supplies, e.g., an A-channel and a B-channel. Most commercial DSLAMs are also controlled by large operating systems that host various application software. Unfortunately, this means most DSLAMs have the potential to fail or lock-up, e.g., due to some software bug.

When a digital subscriber line access multiplexer does lock-up, the time-honored method of recovering is to cycle the power, i.e., reboot. But when a digital subscriber line access multiplexer is located at a telco central office, such location practically prevents it being easy to reboot manually.

There are many large router and ATM switch farms around the country that are equipped by the leading vendors, e.g., Cisco, Bay Networks/Nortel, Ascend, Lucent, Fore, etc. So each of these too has the potential to lock-up and need rebooting, and each of these is very inconvenient to staff or visit for a manual reboot when needed.

Server Technology, Inc., (Sunnyvale, Calif.) markets a 48-VDC remote power manager & intelligent power distribution unit that provides for remote rebooting of remote digital subscriber line access multiplexers and other network equipment in telco central offices and router farms. The SENTRY 48-VDC is a network management center that eliminates the dispatching of field service technicians to cycle power and rectify locked-up digital subscriber line access multiplexers.

Statistics show that seventy percent, or more, of all network equipment lock-ups can be overcome by rebooting, e.g., cycling power off and on. A remote power controller, like the SENTRY, can reduce network outages from hours to minutes.

In a typical installation, the telco central office provides the competitive local exchange carriers with bare rack space and a 48-VDC power feed cable that can supply 60–100 amps. The single power input is conventionally distributed through a fuse panel to several digital subscriber line access multiplexers in a RETMA-type equipment rack. Individual fuses in such fuse panel are used to protect each DSLAM from power faults.

But such fuses frequently weld themselves to their sockets in the fuse panel due to loose contacts and high amperage currents. It is ironic therefore that many digital subscriber line access multiplexers do not have power on/off switches. Thus it requires the fuse to be pried out and put back in so the DSLAM can be powered-off for rebooting. But when the fuse is welded, removing the fuse without damaging the fuse panel can be nearly impossible.

The Server Technology SENTRY 48-VDC accepts from the telco or other site host an A-power feed cable and B-power feed cable. Internally, DC-power is distributed to a set of "A" and "B" rear apron output terminal blocks that are protected by push-to-reset circuit breakers. The fuse panel is no longer required. The A-feed and B-feed are then matched to the newer digital subscriber line access multiplexers that also require A-power supply and the B-power supply inputs.

Sometimes digital signaling lines can lose the carrier. In such cases, the respective DSLAM must be rebooted to restore the DS3 line. A technician is conventionally required to visit the DSLAM, and use a console port to monitor how the software reboots, and if communications are correctly restored to the DS3.

A SENTRY 48-VDC can be used to remotely power-off the digital subscriber line access multiplexer in the event the carrier is lost. A companion asynchronous communications switch can be used to establish a connection to the DSLAM's console port. Power can be cycled to the DSLAM, and the asynchronous communications switch used to monitor the reboot operation to make certain that carrier to the DS3 line restored. The asynchronous communications switch is a low-cost alternative to the expensive terminal server typically used for console port access. The reboot process and the console port monitoring process can both be managed from an operations center, without the need to dispatch technical personnel to the remote location.

The floor space that a competitive local exchange carrier's equipment rack sits upon is very expensive, so the equipment stuffed in the vertical space in a rack ("U-space") must be as compact as possible. A typical rack may house several digital subscriber line access multiplexers, a terminal server, a fuse panel, and 48-VDC modems. A SENTRY 48-VDC uses "3U" (5.25 inches) of vertical RETMA-rack space, and combines the functions of a fuse panel, a terminal server, and a modem. As many as eight 20-Amp devices, or four 35-Amp devices can be supported.

Many host sites, and especially the telephone operating company offices, are very particular about the kind of equipment they allow on their premises. In general, equipment must meet the Network Equipment Building Standards (NEBS) established by Bellcore. For example, Bellcore has established the equipment specifications for fault-tolerance. NEBS was designed by Bellcore to manage and protect the large amount of intricate equipment located at telco central offices. NEBS specifications were designed to address every possible hazard that may occur at a telco central office, including fire, freeze and earthquake. NEBS certification requires products to be evaluated in extreme environments and phenomenon.

The importance and practice of collocating network servers at central offices has grown significantly in recent years with the growth of the ISP market and increasing opportunity for CLECs. NEBS certification is a necessity for equipment that is intended to be collocated within a telephone central office. A NEBS "Certificate of Compliance" can be obtained after product testing by MET Laboratories, and such certificate is recognized by all of the Regional Bell Operating Companies (RBOCs).

A consequence of NEBS is that equipment such as the SENTRY 48-VDC must have 48-VDC battery connectors that not only include positive and negative polarities, but ground too. Such connections must be made with double-hole battery compression lugs so that two nuts are used to fasten each cable. The ground connection must be made with a single cable which is at least one AWG size larger than the power feed cables to be able to carry the largest possible fault currents without open circuiting. The larger cable requires a larger compression lug size.

SUMMARY OF THE PRESENT INVENTION

It is therefore an object of the present invention to provide a power connector for a remote power manager for network appliances.

It is another object of the present invention to provide a battery power connector for a DSLAM power manager that is NEBS compliant.

Briefly, a battery power connector embodiment of the present invention comprises a plastic block with a pair of raised pedestals at opposite ends of one side that fit through rectangular cutouts in the rear panel of a RETMA-rack chassis. A pair of bolt holes in the rear panel between the cutouts and a matching pair of bolt holes between the raised pedestals in the plastic block allow for a mounting that is electrically isolated for the positive and negative terminals, and conductive for the ground terminal in the middle. Inside the chassis, a double-sided printed circuit board is bolted to the back of the plastic block with three pairs of bolts, one pair each for positive, ground, and negative battery cable connections. A threaded backing plate is provided on the outside to receive each of the three pairs of bolts, one for each positive, ground, and negative battery cable connection. A two-hole battery-cable compression lug is then bolted over each threaded backing plate and is held tightly with two nuts and lockwashers each. The printed circuit board provides several wire lugs inside for both battery potentials to be wired to individual on-off power control modules.

An advantage of the present invention is that a power connector is provided that is simple to manufacture and robust in operation.

Another advantage of the present invention is that a power connector is provided for a DSLAM power manager that is NEBS compliant.

These and many other objects and advantages of the present invention will no doubt become obvious to those of ordinary skill in the art after having read the following detailed description of the preferred embodiments which are illustrated in the various drawing figures.

IN THE DRAWINGS

FIG. 4 is a functional block diagram that shows a dual-source battery power manager wired to power-cycle DSLAM, routers, and other network devices.

DETAILED DESCRIPTION OF THE PREFERRED EMBODIMENTS

Figure 1:
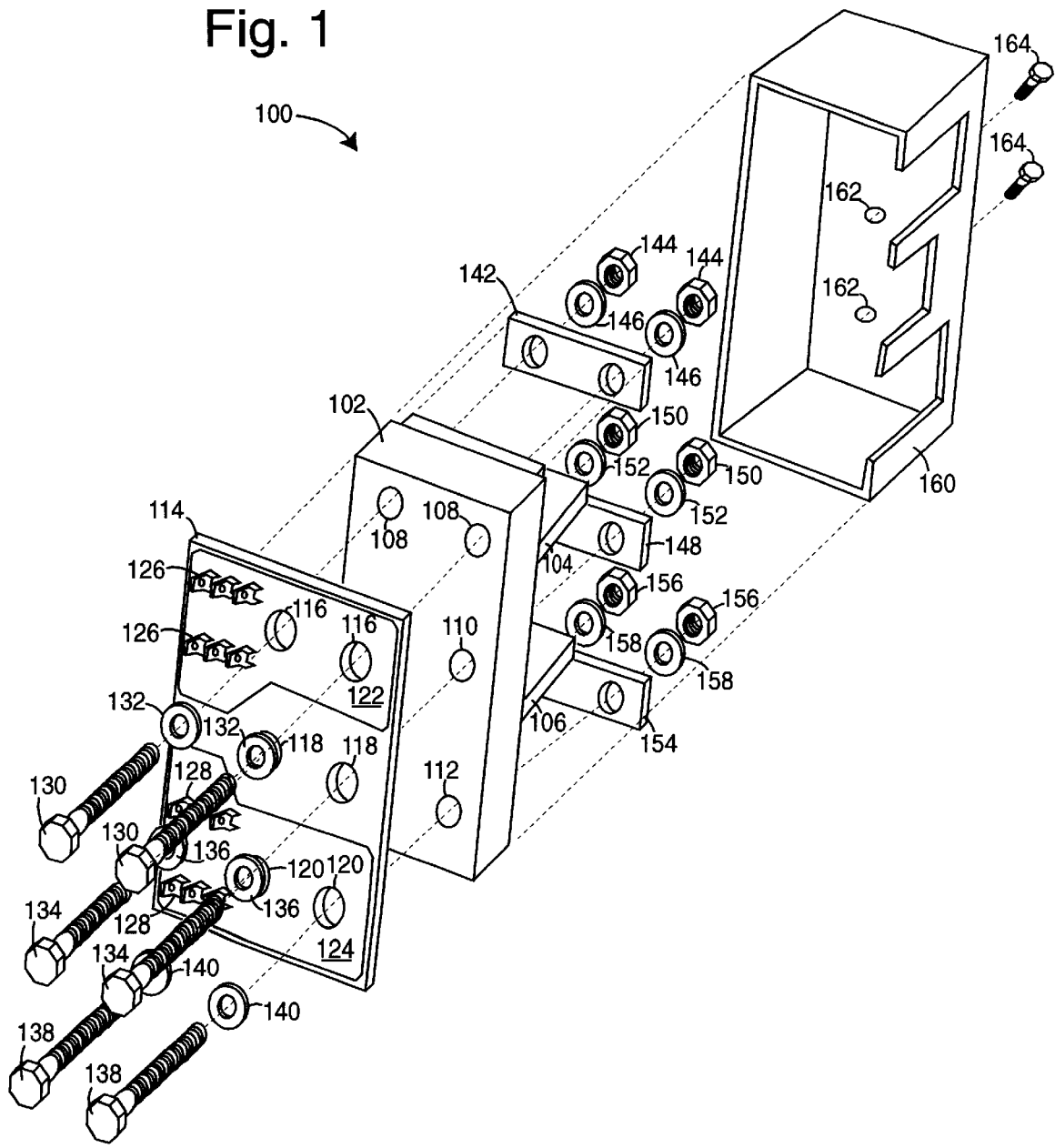
FIG. 1 is an exploded assembly view of a power connector embodiment of the present invention.

FIG. 1 illustrates a power connector embodiment of the present invention, referred to herein by the general reference numeral 100. The power connector 100 is intended to bolt to the rear panel of a standard RETMA-rack chassis. It provides dual 48-volt buses to the equipment within from external banks of batteries. A typical network power controller is in a very mission-critical role, so redundant power connectors 100 are preferred, e.g., one on each rear corner.

The power connector 100 includes a plastic insulating block 102 that has a pair of separator walls 104 and 106, and is typically made of polycarbonate (LEXAN). Such plastic insulating block 102 has a pair of bolt holes 108 for a battery return (+RTN) connection, a pair of bolt holes 110 (only one visible in FIG. 1) for a chassis ground (GND) connection, and another pair of bolt holes 112 (only one visible in FIG. 1) for a battery supply (−48 VDC) connection. A double-sided printed circuit board (PCB) 114 is provided with a pair of bolt holes 116 for the battery return (+RTN) connection, a pair of bolt holes 118 for chassis mounting, and another pair of bolt holes 120 for the battery supply (−48 VDC) connection.

The PCB 114 has a pair of copper foil patterns 122 and 124 that are etched on both sides of an epoxy-fiberglass substrate. The copper foil pattern 122 connects to several wire terminals 126 to distribute the battery-return potential inside a RETMA rack chassis. The copper foil pattern 124 connects to several wire terminals 128 to distribute the battery-supply potential inside such RETMA-rack chassis.

A pair of bolts 130 screw into holes 116 and 108 and use a pair of washers 132. These pass the battery return (+RTN) connection between the copper foil pattern 122 and the external batteries. A pair of bolts 134 pass through holes 118 and 110 and use a pair of washers 136. These are used to connect an external ground connection solidly to the RETMA-rack chassis. A pair of bolts 138 pass through holes 120 and 112 and use a pair of washers 140. These conduct the battery supply (−48 VDC) connection between the copper foil pattern 124 and the external batteries.

A threaded backing plate 142 for a two-hole compression lug connection for the battery return (+RTN) connection is retained by a pair of nuts 144 and locking washers 146. The threads in the backing plate allow the nuts to be removed for battery cable installation without also loosening the bolts 130. A second threaded backing plate 148 for a two-hole compression lug connection for the ground connection is retained by a pair of nuts 150 and locking washers 152. The threads in the backing plate allow the nuts to be removed for battery cable installation without also loosening the power connector 100 from the chassis it may be mounted to. A third threaded backing plate 154 for a two-hole compression lug connection for the battery supply (−48 VDC) connection is retained by a pair of nuts 156 and locking washers 158. The threads in the backing plate allow the nuts to be removed for battery cable installation without also loosening the bolts 138.

A clear plastic cover 160 is used to protect the otherwise exposed battery connections with heavy cables to the power connector 100. The clear plastic cover 160 is made of clear polycarbonate to provide strength and retained by a pair of screws 164 through holes 162 into threaded inserts 166 moulded into the tops of the separator walls 104 and 106.

Figure 2:
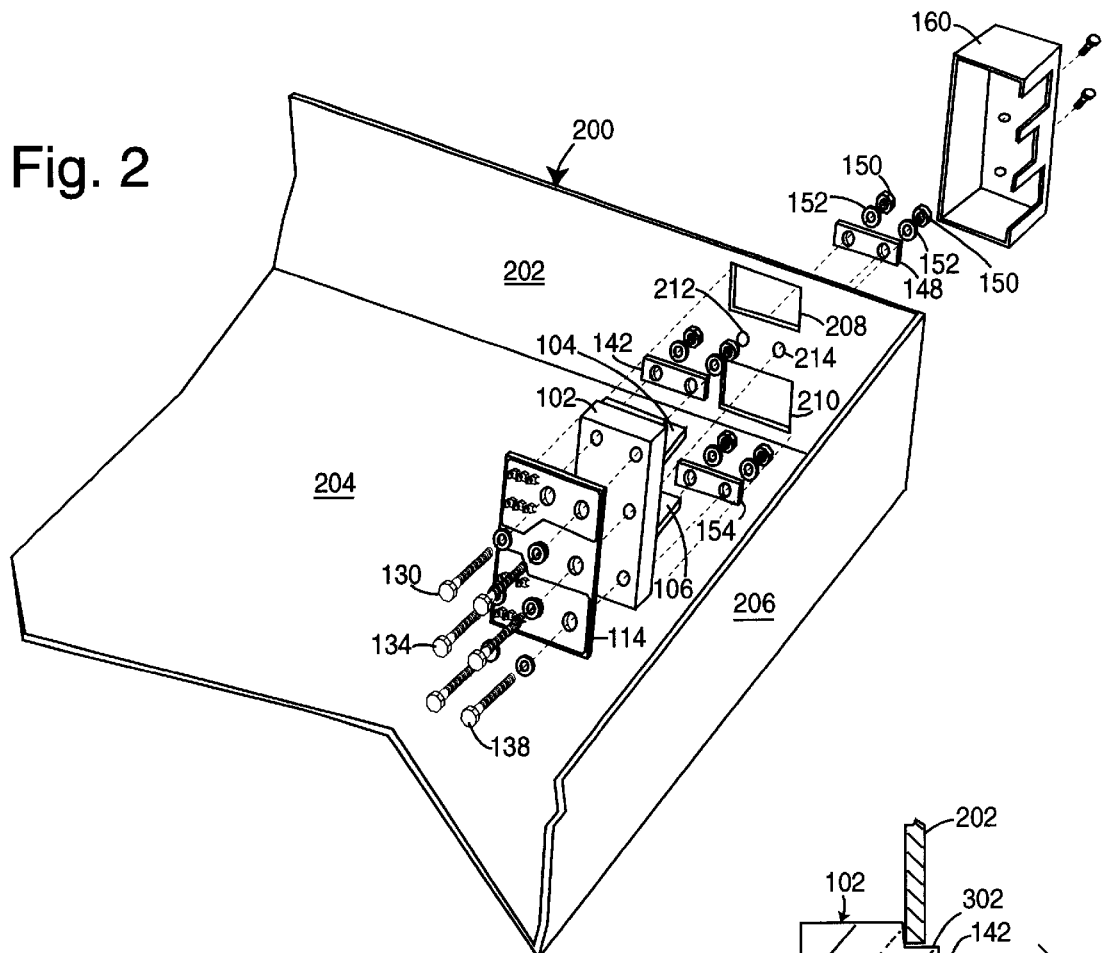
FIG. 2 is an exploded assembly view of the power connector of FIG. 1 being assembled into a system embodiment of the present invention.

FIG. 2 illustrates the power connector 100 mounted to a rear corner of a RETMA-rack chassis 200. Such has a rear panel 202, a bottom panel 204 and a side panel 206. Cutouts 208 and 210 allow the separator walls 104 and 106 to pass completely through. A pair of bolt holes 212 and 214 are provided between the cutouts 208 and 210 that are used by bolts 134 and threaded backing plate 148 for mounting support and electrical connection (GND) to the chassis 200. In preferred embodiments of the present invention, the power connector 100 is constructed symmetrically such that a second, identical unit can be flipped over and mounted in the other corner of rear panel 202. The cover 160 is simply flipped over too for the second unit. Identification labels are silkscreened on chassis 200.

In a prototype that was built of the power connector 100, the bolts that were used for bolts 130 and 138 were 1.75" long ¼–20, and made of stainless steel. Bolts 134 were 1.50" long, with ¼–20 threads, and also of stainless steel. The PCB 114 was one-sixteenth inch thick and 2.75" by 3.25". The block 102 had a base 1.875" by 3.25" by 0.375". The separator walls were 0.1875" thick and stood one inch above the base. A 0.25" thick pedestal under the stainless steel threaded backing plates 142 and 154 raises through cutouts 208 and 210.

Figure 3:
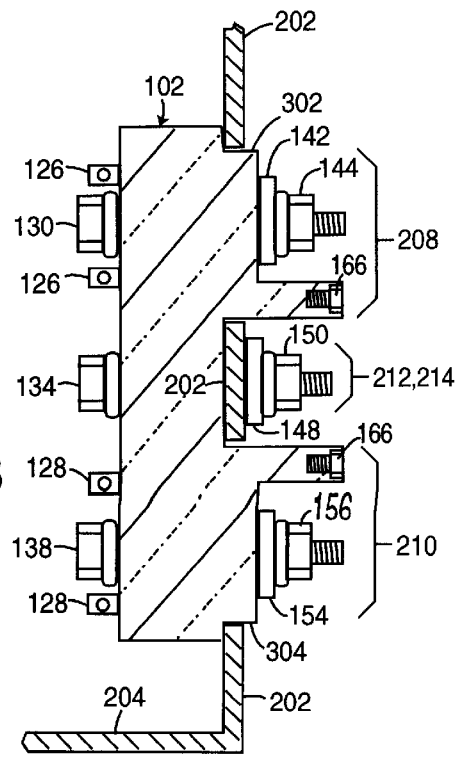
FIG. 3 is a cross-sectional diagram of the power connector of FIGS. 1 and 2 installed in the rear panel of the chassis of FIG. 2.

FIG. 3 illustrates, in cross-section, the same power connector 100 mounted through the rear panel of the RETMA-rack chassis 200. A pedestal 302 in the plastic block 102 raises through the chassis cutout 208. This maintains an electrical isolation between the chassis panel 202 and the bolts 130, backing plate 142 and terminals 126. A pedestal 304 in the plastic block 102 raises through the chassis cutout 210. This maintains an electrical isolation between the chassis panel 202 and the bolts 138, backing plate 154 and terminals 128.

Embodiments of the present invention allow a larger size connector and cable to be attached under nuts 150 to bolts 134 than are attached to either of the other two positions. To be NEBS compliant each power feed needs to support a ground wire, one AWG size larger then the power input wire. This assembly allows a larger compression lug to be connected for the ground.

FIG. 4 represents a system 400 that includes a dual 100-amp battery source power manager 402 wired to power-cycle two DSLAMs 404 and 405, four routers 406, 407, 408 and 409, and two generic network devices 410 and 411. All these are mounted in a single RETMA-rack 412. An A-channel power connector 414 and a B-channel power connector 416 on the power manager 402 receive two circuits of 48-volt battery power from a telco site. A pair of batteries 418 and 420 represent these sources. A plurality of power control modules 422–429 internal to the power manager 402 are independently controlled from a network connection 430 and can individually control A-channel and B-channel DC-power supplied to each DSLAM 404 and 405, routers 406, 407, 408 and 409, and generic network devices 410 and 411.

When any of the DSLAMs 404 and 405, routers 406, 407, 408 and 409, and generic network devices 410 and 411 need to be remotely rebooted, an appropriate network datapacket is sent to the responsible power control modules 422–429 to cause both A-channel and B-channel DC power to cycle off and on.

Although the present invention has been described in terms of the present embodiment, it is to be understood that the disclosure is not to be interpreted as limiting. Various alterations and modifications will no doubt become apparent to those skilled in the art after having read the above disclosure. Accordingly, it is intended that the appended claims be interpreted as covering all alterations and modifications as fall within the true spirit and scope of the invention.

What is claimed is:

1. A power connector, comprising:

a plastic block with a pair of raised pedestals at opposite ends of a front side, and for providing a matching fit through a corresponding pair of rectangular cutouts in a rear panel of a RETMA-rack chassis;

a printed circuit board (PCB) mounted to a back side of the plastic block and having three pairs of holes wherein each pair is respectively connected to a positive-battery, a ground, and a negative-battery voltage potential;

a first plurality of wire terminals mounted to the PCB and electrically connected to receive said positive-battery voltage potential; and a second plurality of wire terminals mounted to the PCB and electrically connected to receive said negative-battery voltage potential.

2. The power connector of claim 1, further comprising:

a first pair of bolt holes disposed in a first of said pair of raised pedestals in the plastic block;

a first threaded backing plate disposed on a top side of a first of said pair of raised pedestals; and a first pair of bolts that pass through a first one of said three pairs of holes in the PCB, and through said first pair of bolt holes disposed in a first of said pair of raised pedestals, and through the first threaded backing plate, and such that all are electrically connected to said positive-battery voltage potential.

3. The power connector of claim 1, further comprising:

a second pair of bolt holes disposed in the plastic block between said raised pedestals, and for matching a similar pair of bolt holes in said rear panel between said cutouts;

a second threaded backing plate disposed on an outside surface of said rear panel between said cutouts, and providing a chassis-ground contact for said ground voltage potential; and a second pair of bolts that pass through a second pair of said three pairs of bolt holes, and through said pair of bolt holes in said rear panel between said cutouts and the second threaded backing plate, and that provide an electrical connection to said ground voltage potential.

4. The power connector of claim 1, further comprising:

a third pair of bolt holes disposed in a second of said pair of raised pedestals in the plastic block;

a third threaded backing plate disposed on said top side of said second of said pair of raised pedestals; and a third pair of bolts that pass through a third pair of said three pairs of holes in the PCB, and through said third pair of bolt holes disposed in said second raised pedestal, and through the third threaded backing plate, and such that all are electrically connected to said negative-battery voltage potential.

5. The power connector of claim 1, further comprising:

a pair of separator walls molded into the plastic block at inner edges of said pair of raised pedestals, and providing for a barrier between battery lug connections with molded threaded inserts for mounting a protective cover.

6. The power connector of claim 1, further comprising:

a protective cover for shrouding any external battery lug connections made to the plastic block.

7. A battery power connector for a RETMA-rack power manager chassis, comprising:

a plastic block with a pair of raised pedestals at opposite ends of a front side, and for providing a matching fit through a corresponding pair of rectangular cutouts in a rear panel of a RETMA-rack chassis;

a printed circuit board (PCB) mounted to a back side of the plastic block and having three pairs of holes wherein each pair is respectively connected to a positive-battery, a ground, and a negative-battery voltage potential;

a first plurality of wire terminals mounted to the PCB and electrically connected to receive said positive-battery voltage potential;

a second plurality of wire terminals mounted to the PCB and electrically connected to receive said negative-battery voltage potential;

a first pair of bolt holes disposed in a first of said pair of raised pedestals in the plastic block;

a first threaded backing plate disposed on a top side of a first of said pair of raised pedestals;

a first pair of bolts that pass through a first one of said three pairs of holes in the PCB, and through said first pair of bolt holes disposed in a first of said pair of raised pedestals, and through the first threaded backing plate, and such that all are electrically connected to said positive-battery voltage potential;

a second pair of bolt holes disposed in the plastic block between said raised pedestals, and for matching a similar pair of bolt holes in said rear panel between said cutouts;

a second threaded backing plate disposed on an outside surface of said rear panel between said cutouts, and providing a chassis-ground contact for said ground voltage potential;

a second pair of bolts that pass through a second pair of said three pairs of bolt holes, and through said pair of bolt holes in said rear panel between said cutouts and the second threaded backing plate, and that provide an electrical connection to said ground voltage potential;

a third pair of bolt holes disposed in a second of said pair of raised pedestals in the plastic block;

a third threaded backing plate disposed on said top side of said second of said pair of raised pedestals;

a third pair of bolts that pass through a third pair of said three pairs of holes in the PCB, and through said third pair of bolt holes disposed in said second raised pedestal, and through the third threaded backing plate, and such that all are electrically connected to said negative-battery voltage potential;

a pair of separator walls molded into the plastic block at inner edges of said pair of raised pedestals, and providing for a barrier between battery lug connections with molded threaded inserts for mounting a protective cover; and a protective cover that shrouds any external battery lug connections made to the plastic block and that mounts to the pair of separator walls with screws.

* * * * *